United States Patent [19]
Palmer et al.

[11] Patent Number: 6,099,693
[45] Date of Patent: Aug. 8, 2000

[54] MOVABLE WATER DISTILLER

[75] Inventors: David G. Palmer; Mark W. Napier, both of Lincoln, Nebr.

[73] Assignee: Pure Water, Inc., Lincoln, Nebr.

[21] Appl. No.: 09/036,073

[22] Filed: Mar. 6, 1998

[51] Int. Cl.$^7$ .............................. B01D 3/02; C02F 1/04; C02F 1/18
[52] U.S. Cl. .............................. 202/83; 159/34; 159/44; 159/DIG. 15; 159/DIG. 40; 159/DIG. 41; 202/167; 202/189; 202/200; 202/185.1; 202/266; 202/267.1; 203/10; 203/86; 203/1
[58] Field of Search .......................... 202/83, 167, 185.1, 202/266, 200, 267.1, 242, 189, 245; 203/1, 10, DIG. 18, 86; 159/34, DIG. 41, 44, DIG. 40, DIG. 15; 122/20, 37; 137/391, 392; 219/403, 346, 520, 386, 523, 533; 211/190; 165/86

[56] References Cited

U.S. PATENT DOCUMENTS

| | | | |
|---|---|---|---|
| 0,398,263 | 2/1889 | Kirkaldy | 202/167 |
| 1,089,831 | 3/1914 | Gasser | 202/83 |
| 1,106,142 | 8/1914 | Hambrock, Jr. | 202/83 |
| 3,741,169 | 6/1973 | Johnson | 122/406 |
| 4,246,065 | 1/1981 | Chirico | 157/DIG. 41 |
| 4,805,692 | 2/1989 | Palmer . | |
| 4,888,097 | 12/1989 | Palmer et al. . | |
| 4,943,353 | 7/1990 | Shannon . | |
| 4,975,154 | 12/1990 | Palmer et al. . | |
| 5,021,128 | 6/1991 | Palmer . | |
| 5,304,286 | 4/1994 | Palmer . | |
| 5,536,375 | 7/1996 | Vogelman | 202/197 |
| 5,662,779 | 9/1997 | Greene et al. | 202/181 |
| 5,705,036 | 1/1998 | Wu et al. | 202/185.3 |
| 5,762,762 | 6/1998 | Breithaupt et al. | 202/83 |

*Primary Examiner*—Virginia Manoharan
*Attorney, Agent, or Firm*—Van Dyke, Gardner, Linn & Burkhart, LLP

[57] ABSTRACT

A movable water distiller capable of use in conjunction with a water heater includes a frame having a top which supports the water heater. The distiller components are supported on a tray having a guide assembly engaging a track assembly horizontally positioned in the bottom region of the frame. The guide assembly allows the distiller components to be inserted within, and extracted from, the frame interior while the track assembly maintains alignment of the tray. Alternatively, the guide assembly may be attached to the top surfaces of the track assembly. Paneling surrounds the sides and back of the frame, while a front cover is attached to the front of the tray. The front cover and the paneling enclose the interior of the frame and prevent access to the distiller components. A top cover having a base plate with a cut-out section, over which is placed a vertical member having an interior, is positioned on both the front cover and the top of the frame to provide protection for the conduits running from the distiller to the water heater. In a preferred embodiment, the tray supports a fluid sensor in operational connection with the control box. When the sensor detects a preselected quantity of fluid residing on the tray, the control box deactivates the distiller components.

43 Claims, 5 Drawing Sheets

MOVABLE WATER DISTILLER

BACKGROUND OF THE INVENTION

This invention relates to combined water distiller and water heater assemblies. In particular, the present invention pertains to the water distiller assembly and the manner in which the water distiller assembly is combined with the operation of a water heater to yield a water supply system.

The ever present need to increase energy efficiency has driven many manufacturers of water supply systems to combine the operations of a water heater, which supplies water for domestic purposes such as showers, baths and the like, with the operation of a water distiller which commonly supplies water for drinking purposes. The incentive for combining such systems is that the heat energy in the form of steam required to distill water is utilized by diverting such steam to the water heater wherein it is used to at least partially heat the contents of the water within the water heater. This utilization of heat energy increases efficiency and thus reduces costs.

Combined water supply systems typically include a water distiller placed in proximity to, and in operational connection with, a water heater. The distiller contains a boiling chamber which receives water from a water source. In this chamber the liquid is converted to steam and transported from the boiling chamber via an outlet conduit. The outlet conduit of the boiling chamber is in fluid communication with the condenser positioned within the interior of the water heater. The thermal gradient between the water in the water heater and the steam within the condenser results in the steam transferring its heat energy through the condenser and to the water within the heater. In doing so, the steam condenses. An inlet conduit transports the condensed water from the condenser to a storage tank located in the distiller unit. Upon demand for distilled drinking water, a pump is actuated to draw water from the storage tank, through a filter, and subsequently to a faucet, an ice maker, or the like. An electrical control box within the distiller regulates the operation of both the boiling chamber and the pump.

Despite the substantial energy savings gained by combining these two systems, there still exists problems with respect to the combined assembly which have not been addressed by the prior art. In an effort to promote effective space utilization, these combined systems are normally arranged in one of two ways; the first being wherein the water heater is positioned on top of a frame or housing, with the distiller located underneath or within the frame. Alternatively, some systems have the distiller unit positioned on top of the water heater. Despite the exact spacial relationship, the distiller unit is almost invariably contained in an enclosed housing.

When repair or replacement of one or more of the components within the distiller is required, an operator must first disconnect the tubes connecting the distiller to the water heater. Thereafter, if the distiller is located on top of the water heater, the operator may attempt repair or replacement by first disassembling the exterior housing and subsequently working on the component or components of interest. If it is not feasible to repair the distiller while positioned atop the hot water heater due to space constraints, the operator is forced to remove the entire distiller, including its housing, from the top of the water heater and transport the same to a convenient location wherein the housing may be disassembled.

If the distiller is located beneath the hot water heater, the operator may attempt to disassemble the housing and work without having to remove the distiller from the combined assembly. However, again due to space constraints, this may not be possible and the operator must first remove the entire distiller unit from beneath the hot water heater, and subsequently disassemble the exterior housing before repair may be effectuated.

Whether the distiller is above or below the water heater, repair accomplished in the above referenced manner is unsuitable for a number of reasons. First, due to the close quarters in which these combined assemblies are located, the operator is almost invariably required to remove the entire distillation unit from the assembly before repair can be effectuated. Second, even once removed, the housing of the distiller must be fully disassembled before one can begin repair of the particular components.

Another problem present in these combined systems, and water distillers in general, is the problem of electrical damage caused by water leaking within the unit. Almost every component within a distiller is susceptible to damage caused by water leaking from the conduits, storage chamber, or boiling chamber. The electrical control box governing the operation of the distiller is particularly vulnerable to damage as a result of water leaking from one of the other components. If such leakage remains undetected, the electrical circuits within the control box may be irreparably damaged, and hence necessitate replacement of the unit.

Thus, there exists a need for a water distiller which can easily be removed from its housing to effectuate repair, and contains a water leak detection means.

SUMMARY OF THE INVENTION

The present invention overcomes the difficulties of the prior art by providing a water distillation unit for use in combination with a water heater tank, wherein the distiller may be simply and conveniently accessed and, if necessary, removed from the assembly to effectuate repair.

According to an aspect of the present invention, a frame supports a water heater tank in fluid communication with a water distiller. The water distiller is removably inserted within the interior of the frame. Preferably, the water heater tank is positioned on the top of the frame. The combination of a water heater tank supported above a removable distiller provides a water supply system wherein the system effectively utilizes space while permitting convenient access to the distiller.

According to another aspect of the invention, the distiller components are positioned within, and secured to, a tray or drawer which is removably inserted within the interior of the frame. In a preferred form, the frame contains a guide assembly which maintains proper alignment of the tray during insertion and extraction from the frame. Additionally, a guide assembly may be attached to the tray, or the top surface of the track assembly, to facilitate movement of the tray into, and out of, the frame. When removed from the frame, the distiller components can be easily transported, and because the components are exposed to view, repair or replacement of a particular component may be achieved without further disassembly.

In another aspect of the invention, the interior surface of the tray supports a fluid sensor in operational connection with the water distiller's control box. When the fluid sensor detects a preselected level of fluid residing in the tray, a signal is sent to the control box. Upon receipt of this signal, the control box will automatically deactivate the components of the distiller. This feature prevents damage to the distiller components due to a water leak within the system, and hence prolongs the economic life of the distiller.

These and other objects, advantages and features of this invention will become apparent upon review of the following specification in conjunction with the drawings.

BRIEF DESCRIPTION OF THE DRAWINGS

FIG. 3b is a sectional view taken along line III—III in FIG. 3a;

FIG. 4b is a sectional view taken along line IV—IV in FIG. 4a;

FIG. 6b is a sectional view taken along line VI—VI in FIG. 6a;

DETAILED DESCRIPTION OF THE PREFERRED EMBODIMENTS

Figure 1:
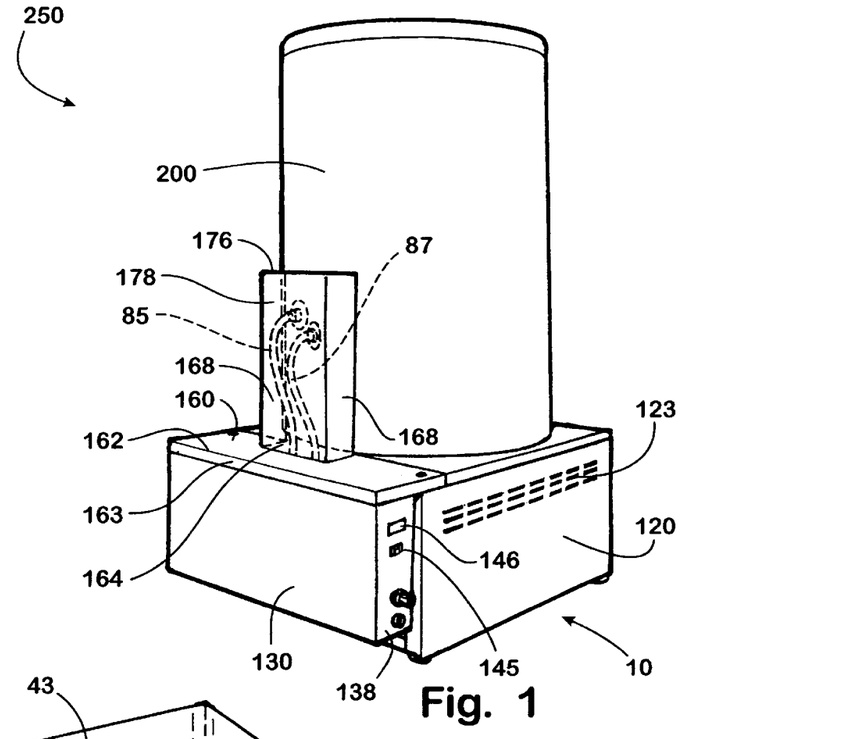
FIG. 1 is a perspective view of a movable distiller, according to the invention, illustrated supporting a water heater.

Referring now specifically to FIG. 1, there is shown a perspective view of a removable distiller according to a preferred embodiment of the present invention and generally designated by reference numeral 10. Shown positioned atop, and supported by, distiller 10 is a water heater tank 200. Distiller 10 and water heater tank 200 are operationally connected in a manner which will be described in detail below, and together define a water supply system 250 used to provide both hot water for showers, baths and the like, and distilled water for drinking, cooking and the like. Since removable distiller 10 of the present invention is particularly well suited for use with water heater tank 200, the present invention will be described in use therewith. However, it will be appreciated by those skilled in the art that removable distiller 10 may be used as a stand alone water distiller unit, and that such an alternative application is within the spirit and scope of the present invention. It should also be understood that although distiller 10 is preferably underneath water heater tank 200 in the preferred embodiment, it could also be positioned above the water heater tank 200.

Figure 2:
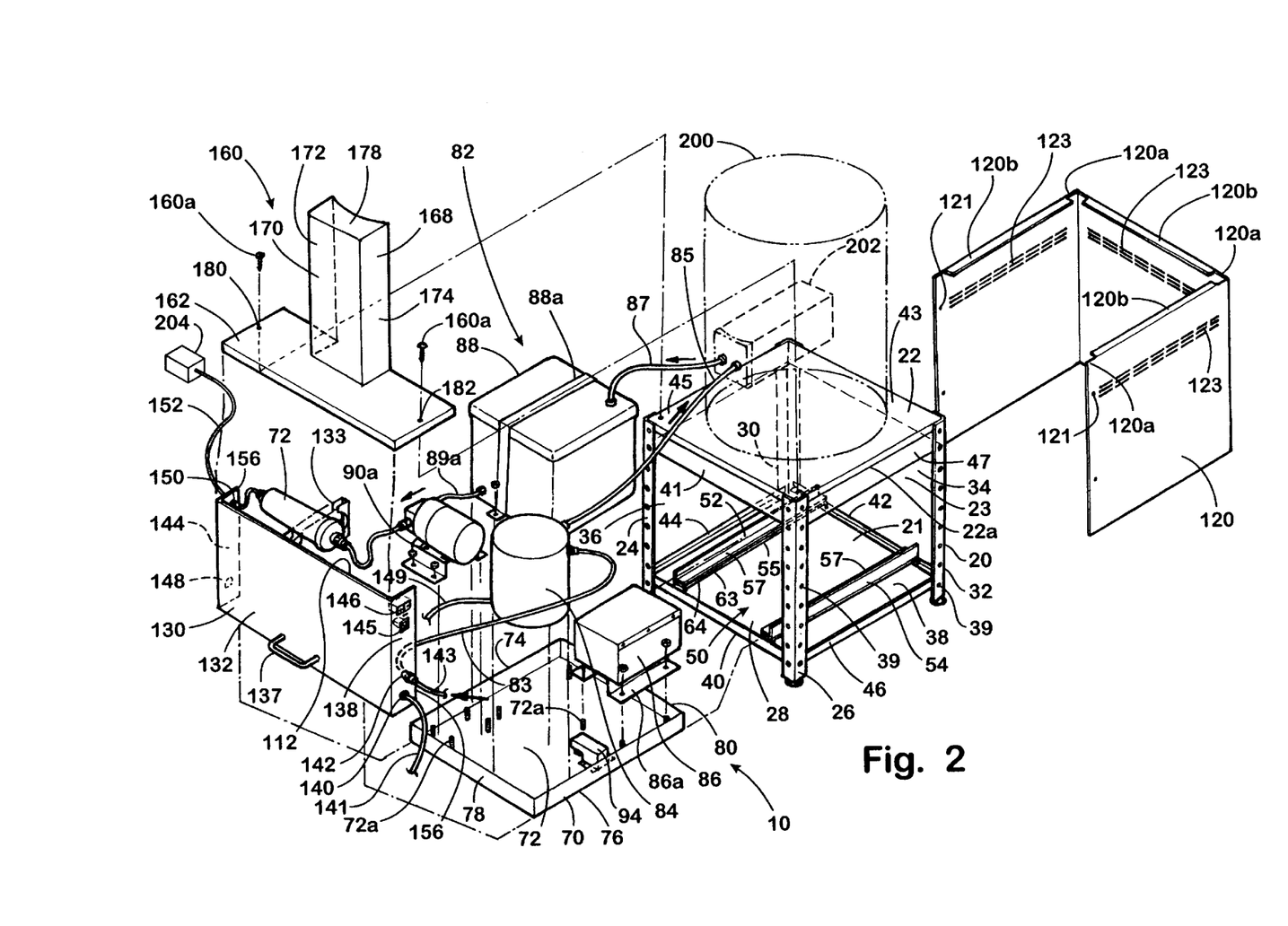
FIG. 2 is an exploded perspective view of the movable distiller in FIG. 1.

Turning now to FIG. 2, removable distiller 10 comprises a support or frame 20 dimensioned to receive a drawer or tray 40 which supports distiller components 82. Water heater tank 200 is positioned on, and is supported by top 22 of frame 20.

Frame 20 includes a first leg 24 and a second leg 26 defining a front 28, while a third leg 30 and fourth leg 32 define a back 34. Opposing sides 36 and 38 are defined by legs 24 and 30, and legs 26 and 32, respectively. Preferably, legs 24, 26, 30, and 32 are L-shaped members with a plurality of apertures 39 formed along both surfaces of each leg. Lower cross support members 40 and 42 are positioned between legs 24 and 26, and 30 and 32, respectively. Sides 36 and 38 are also fitted with lower cross support members 44 and 46 spanning between legs 24 and 30, and 26 and 32, respectively. All of the lower cross support members 40, 42, 44, and 46 are positioned in bottom region 21 of interior 23 of frame 20. Each lower cross support member is secured to their respective legs by welding or equivalent attachment assemblies such as nut and bolt assemblies. Both front 28 and back 34, as well as sides 36 and 38 are fitted with an upper cross support members 41, 43, 45, and 47, respectively. These upper cross support members are also attached to their respective legs by any means commonly employed in the art and serve to provide structural integrity to top 22 in order to support water heater tank 200. Attached to, and spanning horizontally between, lower cross support members 40 and 42 is a track assembly 50. Frame 20 can be manufactured from any material having requisite strength necessary to support water heater tank 200. Such materials include, but are not limited to metals, metal alloys and polymeric compositions. In addition, frame 20 can be manufactured in different sizes to thereby accommodate water heaters and water distillers of varying dimension.

In a preferred embodiment as shown in FIGS. 2, 3a, 3b, 4a and 4b, track assembly 50 includes individual tracks 52 and 54 placed a preselected distance apart. Track 52 and 54 include a flat, substantially planar platform 55 having ends 56a and 56b which project downward from platform 55. Ends 56a and 56b are welded or bolted to cross members 40 and 42. Attached to surfaces 56 of platforms 55 are L-shaped members 57. Attachment of L-shaped members 57 to platforms 55 may be achieved by running nut and bolt assemblies 58 through apertures 60 and 61 formed in platforms 55 and L-shaped members 57, respectively. However, it will be recognized by those with ordinary skill that other means of attachment may be used in lieu of nut and bolt assemblies 58 without departing from the spirit and scope of the present invention. Such alternative attachment means include, but are not limited, to welding and epoxies. Preferably, L-shaped members 57 are oriented upon platforms 55 such that ends 63 of platforms 55 are approximately co-planar with sections 64 of L-shaped members 57, as shown in FIG. 2.

Figure 7:
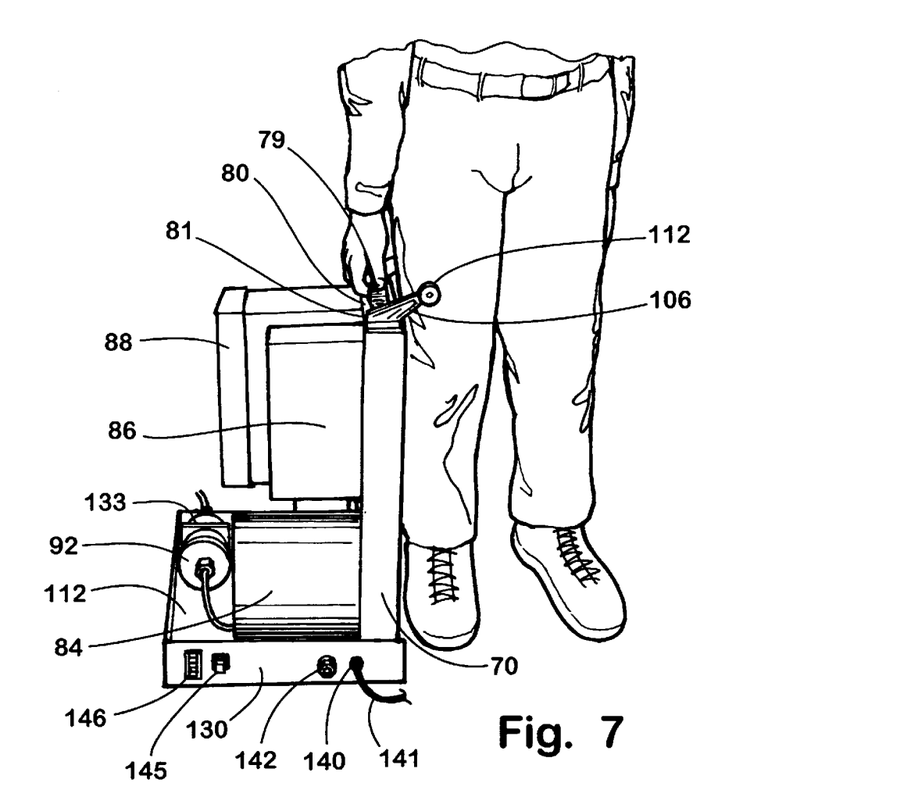
FIG. 7 is a perspective view of a moveable distiller according to the invention being transported.

Tray 70 is composed of a bottom 72 attached to opposing sides 74 and 76, front 78 and back 80. Sides 74 and 76 as well as back 80 and front 78 project orthogonally from bottom 72 in an upward direction. Preferably, bottom 72 is formed such that it contains no holes, apertures or openings which would enable fluid to pass therethrough. Exterior surface 81 of back 80 is formed with a handle 79 (FIG. 7). Tray 70 may be made of any material commonly employed in the art having sufficient strength. Such material include, but are not limited to metals, metal alloys and polymeric compositions.

Bottom 72 of tray 70 receives and supports distiller components 82, which include a boiling chamber 84 having a heating element disposed within its interior (not shown), an electrical control box 86, a storage tank 88, and a pump 90. Bottom 72 of tray 70 may also support a filter 92. Alternatively, filter 92 may be positioned within the interior surface 134 of a front cover 130, which will be discussed in detail below. Pump 90 may be mounted on support 90a, while control box 86 may be mounted on a support 86a. A bracket 88a secures storage tank 88 to bottom 72. As illustrated in FIG. 2, supports 86a and 90a, and bracket 88a are attached to bottom 72 by fasteners 72a. However, it will be understood by those with ordinary skill in the art that other attachment means may be substituted for fasteners 72a without departing from the spirit and scope of this invention.

Operation of distiller 10 in combination with water heater tank 200 involves the transportation of water via conduit 83 into the interior of boiling chamber 84 wherein it is converted to steam. Steam from boiling chamber 84 is transported via inlet conduit 85, in fluid communication with water heater tank 200, into the condenser 202 positioned within the interior of water heater tank 200. While within the condenser 202, the steam transfers its heat energy to the water present within water heater tank 200 and is converted back to a liquid state. An outlet conduit 87 in fluid communication with the condenser 202 transports the condensed water from water heater tank 200 to storage tank 88. When distilled water is desired pump 90, in fluid communication with storage tank 88, pumps water from storage tank 88 via conduit 89a, through filter 92 and subsequently to a faucet 204. Electrical control box 86 governs the operation of boiling chamber 84 and pump 90, and is in electrical connection therewith. Although not essential for an understanding of the present invention, details concerning the operation of a water heater tank and distiller assembly may be found in U.S. Pat. No. 5,304,286 entitled WATER SUPPLY SYSTEM, issued to Palmer on Apr. 19, 1994, which is incorporated herein by reference. It will be immediately recognized by those with ordinary skill in the art that distiller 10 may operate as a stand alone distiller by replacing the conduits 85 and 87 with a single conduit, including a heat exchanger thereby defining a condenser, connected between boiling chamber 84 and storage tank 88.

In a preferred embodiment, bottom 72 supports a fluid sensor 94 in electrical connection with control box 86. When a preselected level of water accumulates on bottom 72 due to a leak in one or more of distiller components 82, fluid sensor 94 issues a signal to control box 86. Upon receipt of such signal, control box 86 will deactivate pump 90 and boiling chamber 92, thereby reducing the probability of damage to distiller components 82. Fluid senor 94 may be any fluid sensor normally utilized in the art having the requisite degree of precision, such as of the type disclosed in co-pending application Ser. No. 08/857,702 filed May 16, 1997 by John M. Swancara for a WATER DISTILLER CAPABLE OF PRODUCING WATER USEABLE IN MEDICAL APPLICATIONS, the disclosure of which is hereby incorporated herein by reference.

Figure 3A:
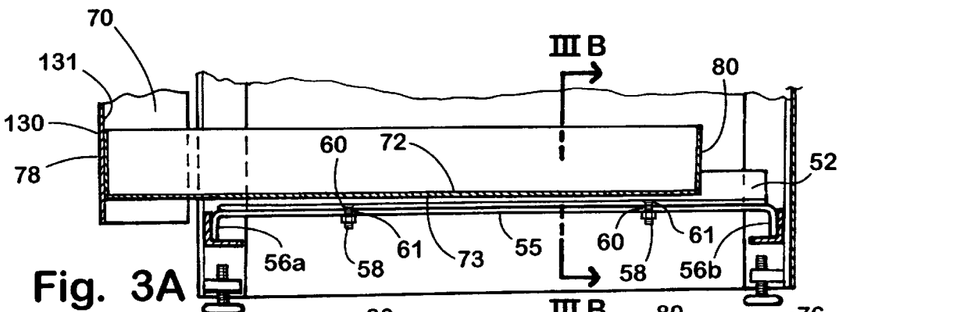
FIG. 3a is a side elevation of a movable distiller with a portion removed to illustrate the guide assembly and track assembly.
Figure 3B:
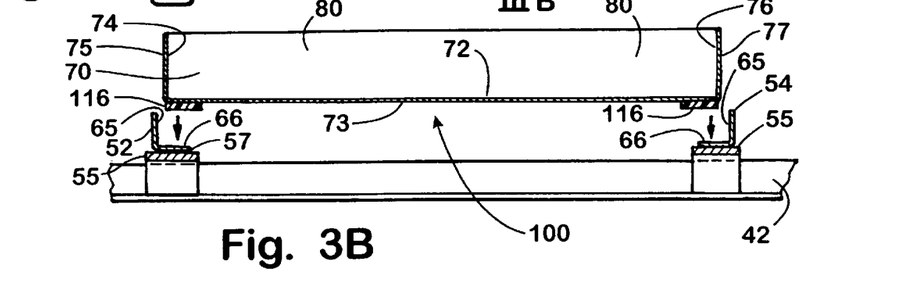

As shown in FIGS. 3a and 3b, a guide assembly 100 is attached to exterior surface 73 of bottom 72 of tray 70. Guide assembly 100 is preferably comprised of strips 116 made of a material having a low coefficient of friction. Strips 116 run from front 78 to back 80 of tray 70 and are positioned a preselected distance apart. When tray 70 is inserted in frame 20, strips 116 slidingly engage surfaces 66 of L-shaped members 57, thereby facilitating insertion of tray 70 into interior 22 of frame 20, and extraction therefrom. Preferably, the distance between surfaces 65 of L-shaped members 57 is only slightly larger than the distance defined by exterior surfaces 75 and 77 of opposing sides 74 and 76 of tray 70, thereby assuring that proper alignment is maintained between tray 70 and L-shaped members 57 during insertion and extraction of tray 70 from frame 20. Strips 116 may be attached to exterior surface 73 by any means commonly used in the art including adhesives or thermal bonding. Preferably, strips 116 are made of tetrafluoroethylene which is commonly sold under the trademark TEFLON.

Figure 4A:
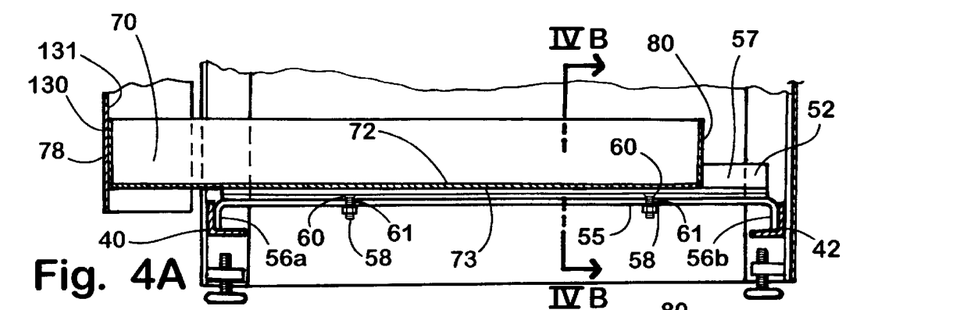
FIG. 4a is the same view as FIG. 3a of an alternative embodiment thereof.
Figure 4B:
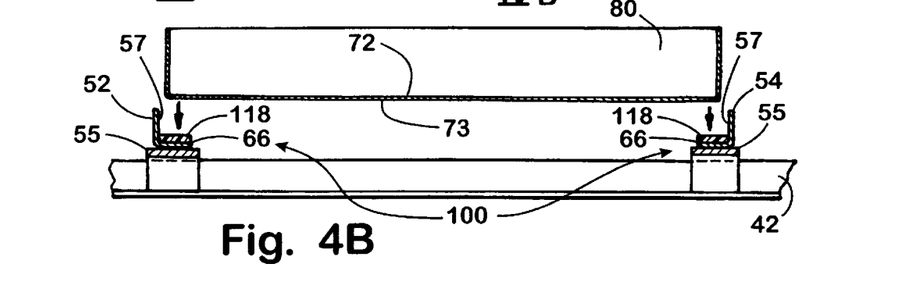

As shown in FIGS. 4a and 4b, guide assembly 100 may also be embodied in strips 118 of material which are attached to surfaces 66 of L-shaped members 57. Again, strips 118 must have a low coefficient of friction so as to enable under surface 73 of tray 70 to slide therealong. Preferably, strips 118 are made of TEFLON™.

Figure 5:
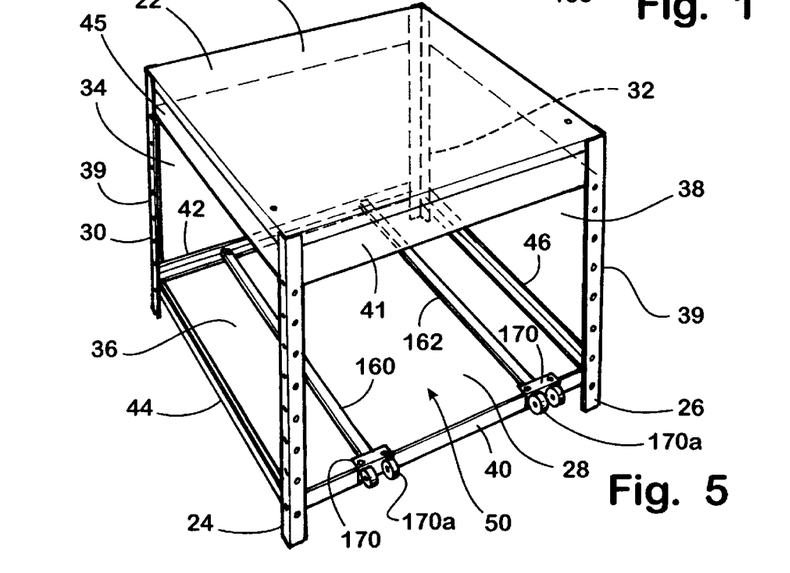
FIG. 5 is a perspective view of the frame and track assembly of a moveable distiller according to another alternative embodiment of the invention.
Figure 6A:
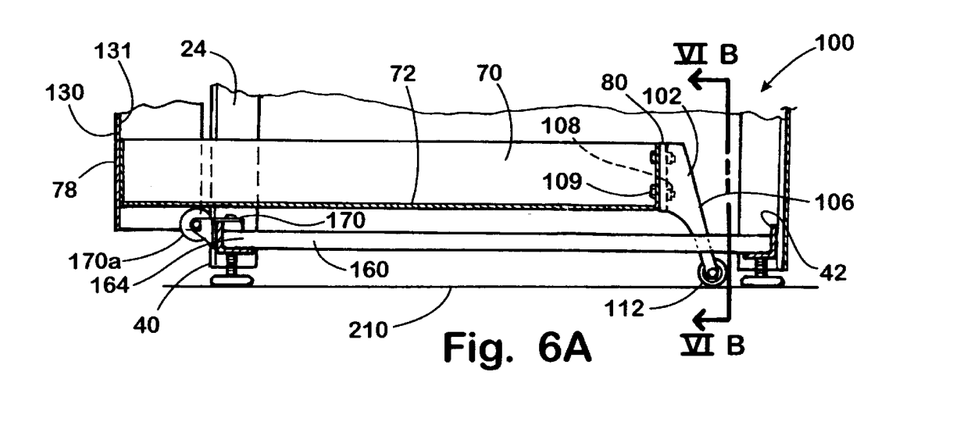
FIG. 6a is the same view as FIG. 3a of the frame and track assembly in FIG. 5.
Figure 6B:
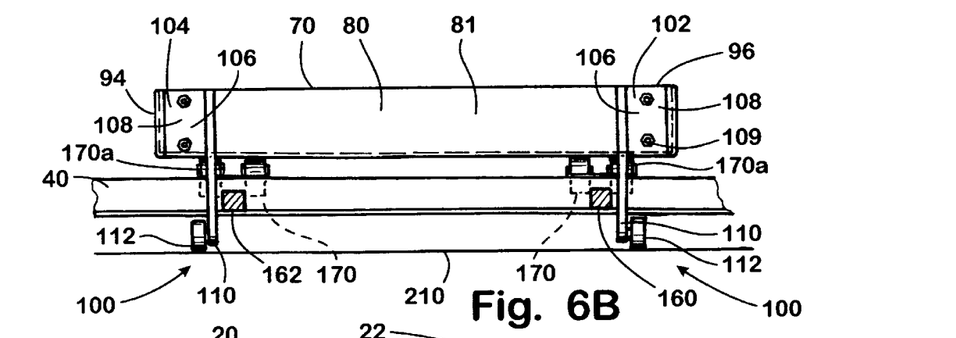

Attention is now directed to FIGS. 5, 6a and 6b, wherein an alternative preferred embodiment for track assembly 50 and guide assembly 100 is illustrated. In this embodiment, track assembly 50 is comprised of a pair of rods or bars 160, 162 extending horizontally between cross supports 40 and 42. Ends 164 of bars 160, 162 are affixed to brackets 170 welded to cross support 40. Extending from brackets 170, away from frame 20 are wheels 170a. Wheels 170a contact exterior surface 73 of tray 70 and hence further simplify movement of tray 70 into and out of frame 20.

As illustrated in FIGS. 6a and 6b, guide assembly 100 is secured to exterior surface 81 of back 80 of tray 70. Preferably, guide assembly 100 includes a pair of guide members 102, 104 attached to opposing ends 94 and 96 of back 80. Each guide member 102, 104 includes a body 106 having ends 108 and 110. Ends 108 of bodies 106 are attached to back 80 by any means commonly employed in the art. As illustrated, nut and bolt assemblies 109 are used to affix ends 108 to back 80. Wheels 112 are attached to ends 110 of guide members 102 and 104 and rotate about a horizontal axis. Guide members 102 and 104 are angled such that wheels 112 are positioned below the horizontal plane defined by bottom 72 of tray 70.

The distance between bars 160, 162 is slightly less than the distance between guide members 102 and 104 such that when tray 70 is inserted within frame 20, guide members 102 and 104 will be positioned between bar 160 and side 36, and bar 162 and side 38 respectively. During the insertion of tray 70, wheels 112 of guide members 102, 104 roll along floor 210, and facilitate movement of tray 70 from front 28 to back 34 of frame 20, while bars 160 and 162 serve to maintain alignment of tray 70 by preventing lateral movement.

Paneling 120 is attached to sides 36 and 38 and back 34 of frame 20. Paneling 120 is preferably an integrally formed piece of material having a C-shape conforming to the dimensions of sides 36 and 38 and back 34. Paneling 120 is attached to legs 24 and 26 of frame 20 by nut and bolt assemblies extending through apertures 121 and 39. Alternatively, paneling 120 may be formed of separate sheets of material attached to sides 36 and 38 and back 34. Air vents 123 allow ventilation of distiller components 82. Lips 120b formed in top surface 120a of paneling 120 are received by slots 22a positioned between top 22 and the upper cross supports of frame 20. Paneling 120 may be made of any rustproof material commonly employed in the art having sufficient strength and rigidity. Such materials include, but are not limited to certain metals and metal alloys and polymeric compositions.

Figure 9:
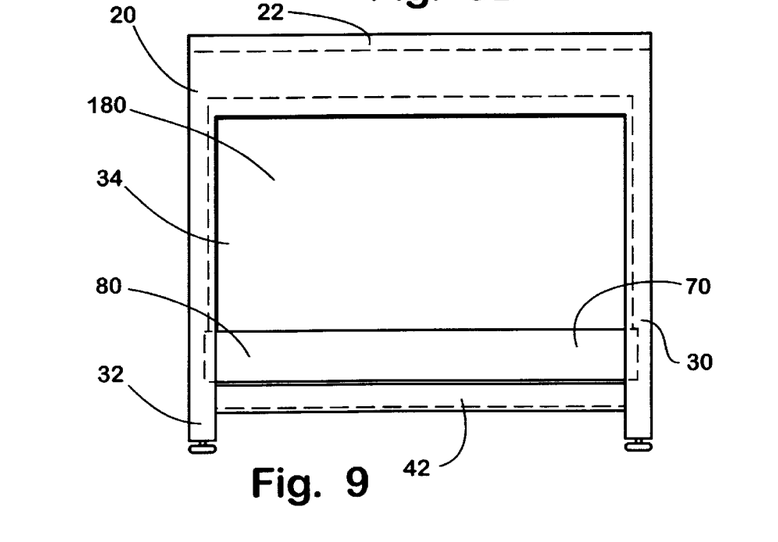
FIG. 9 is a rear view of a movable distiller according an alternative embodiment of the invention.

In an alternative embodiment, as illustrated in FIG. 9, a storage tank 180 may be sized to completely extend across, and cover back 34 of frame 20. Thus, in this embodiment, paneling 120 would be needed only for sides 36 and 38.

A front cover 130 is attached to sides 74 and 76 of tray 70 and positioned over front 28 of frame 20. Front cover 130 includes a front plate 132 and a pair of side plates 138 and 144 extending orthogonally therefrom. A clip 133 attached to interior surface 134 of front plate 132 supports filter 92. Side plate 138 is formed with an aperture 140 enabling electrical cord 141 connected to control box 86 to extend therethrough and be connected to a power source (not shown). Aperture 142 permits water inlet conduit 83, in fluid connection with boiling chamber 84, to run therethrough. Side 138 preferably includes a load control shunt 145 in electrical connection with control box 86 and an energy consumption meter 146 in operational connection with water heater tank 200. Side 144 of front cover 130 contains an aperture 148 through which conduit 149 extends. Conduit 149 is operationally connected to a drain valve in boiling chamber 84, and enables the liquid contents of boiling chamber 84 to be drained therefrom. Conduit 152, in fluid connection with filter 92, extends through aperture 150 and permits the transportation of water from filter 92 to a faucet (not shown).

Figure 8:
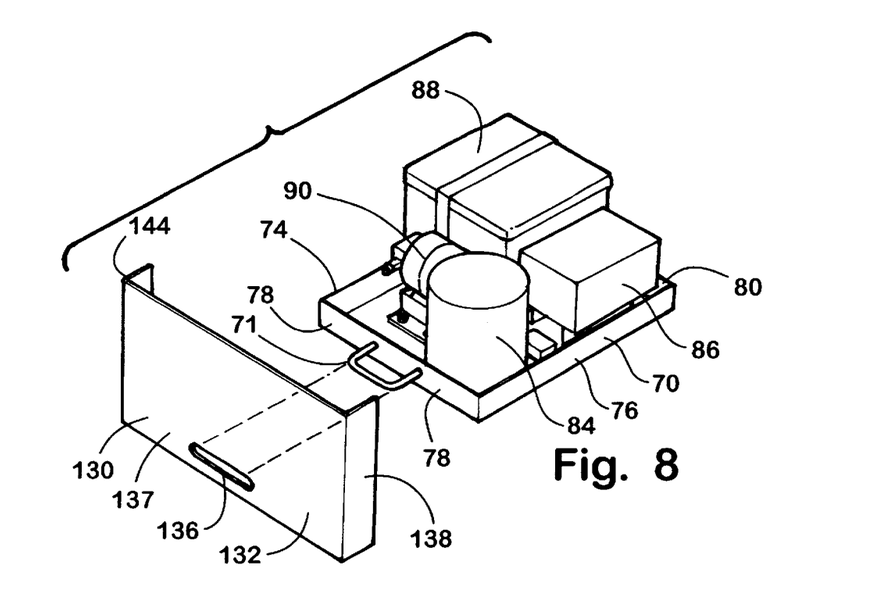
FIG. 8 is an exploded perspective view of a front cover and tray of a moveable distiller according to an alternative embodiment of the invention.

Interior surface 131 of front cover 130 is welded to front 78 of tray 70. To facilitate insertion of tray 70 within frame 20 a handle 137 extends from exterior surface 135 of front plate 132 of front cover 130. Alternatively, as shown in FIG. 8, front plate 132 may be formed within a cutout section 136 enabling a handle 71 attached to front 78 of tray 70 to extend therethrough. When tray 70 is positioned with interior 23 of frame 20, surfaces 154 and 156 of side plates 138 and 144, respectively abut legs 24 and 26. Front cover 130 together with paneling 120 serve to enclose frame 20, thereby preventing tampering or inadvertent contact with distiller components 82.

To protect conduits 85 and 87 running from distiller 10 into water heater tank 200, a top cover 160 is provided. Top cover 160 includes a base plate 162 having a cut-out section 164. Positioned over cut-out section 164 is a vertical member 168 having a face 170, opposing sides 172, 174 and a top 176, defining an interior 178. When tray 70 is inserted within frame 20, top cover 160 is positioned such that a portion of base plate 162 resides on top 22 of frame 20 while surface 163 of base plate 162 is approximately coplanar with front plate 132 of front cover 130. When so positioned, conduits 85 and 87 extend through cut-out section 164 and reside within interior 178 of vertical member 168 and hence are protected from tampering or inadvertent contact. Attachment between top cover 160 and frame 20 is achieved by screw type fasteners 160a which are inserted through apertures 180 in base plate 162 and extend within top 22 of frame 20. Top cover 60 may be formed from any material commonly used in the art. Such materials include, but are not limited to, metals, metal alloys and polymeric compositions.

To assemble distiller 10, tray 70 having distiller components 82 positioned thereon, is inserted within frame 20. Thereafter, paneling 120 is attached to frame 20. Subsequent to attaching conduits 85 and 87 to water heater tank 200, top cover 160 is put into position, and fastened to top 22 of frame 20. Distiller 10 and water heater tank 200 can thereafter be run in accordance with normal industry procedure.

When routine maintenance or repair of distiller components 82 is required, top cover 160 is removed and conduits 85 and 87 are disconnected from water heater tank 200. Thereafter, handle 137 or handle 71 is used to facilitate the extraction of tray 70 from frame 20. As illustrated in FIG. 7, once tray 70 is removed from interior 23, handle 79 positioned on back 80 of tray 70 may be used to conveniently lift and subsequently transport distiller components 82 to a more convenient location for servicing and repair.

Changes in modifications in the specifically described embodiments can be carried out without departing from the principles of the invention, which is intended to be limited only by the scope of the appended claims as interpreted according to the principles of patent law including the doctrine of equivalents.

The embodiments of the invention in which an exclusive property or privilege is claimed are defined as follows:

1. A water supply system comprising:

a water heater tank;

a frame, said frame supporting said water heater tank, said frame having a bottom region; and a movable distiller removably positioned in said frame, said movable distiller in fluid communication with said water heater tank, said movable distiller including a boiling chamber, a storage chamber in fluid communication with said boiling chamber, and a drawer supporting said boiling chamber and said storage chamber.

2. The water supply system as recited in claim 1, wherein said frame has a top, and wherein said water heater tank is positioned an said top of said frame.

3. The water supply system as recited in claim 1, wherein said movable distiller further includes a pump in fluid communication with said storage chamber, a control box in electrical connection with said boiling chamber and said pump, and wherein said drawer supports said pump and said control box.

4. The water supply system as recited in claim 3, wherein said frame has a front and said water supply system further comprises a front cover attached to said drawer, said front cover positioned over said front of said frame, said front cover having an interior surface.

5. The water supply system as recited in claim 4, her comprising a filter attached to said interior surface of said front cover, wherein said filter is in fluid communication with said pump positioned in said drawer.

6. The water supply system as recited in claim 3, wherein said frame has a back and an interior, said storage chamber positioned proximate to said back of said frame when said drawer is positioned within said interior of said frame, said storage chamber dimensioned to prevent access to said interior of said frame from said back of said frame when said drawer is positioned in said interior.

7. The water supply system as recited in claim 1, wherein said frame further comprises a horizontal track assembly positioned in said bottom region of said frame, said track assembly maintaining alignment of said movable distiller when said movable distiller is moved between a first position wherein said movable distiller is inserted in said frame and a second position wherein said movable distiller is extracted from said frame.

8. The water supply system as recited in claim 7, wherein said removable distiller further comprises a guide assembly, said guide assembly slidingly engaging said track assembly when said removable distiller is moved between said first position and said second position.

9. The water supply system as recited in claim 1, wherein said frame has a front and said water supply system further comprises a front cover attached to said removable distiller, said front cover positioned over said front of said frame.

10. The water supply system as recited in claim 1, wherein said frame has a back and opposing sides, and wherein said water supply system further comprises paneling attached to said opposing sides and said back of said frame.

11. The water supply system as recited in claim 1, further comprising a condenser in fluid communication with said boiling chamber and said storage chamber, said condenser condensing steam forwarded from said boiling chamber and forwarding the condensed water to said storage chamber.

12. The water supply system as recited in claim 11, wherein said condenser is positioned in said water heater tank.

13. A water supply system comprising:
a water heater tank having a condenser positioned therein;
a water distiller having a first conduit in fluid communication with said water heater tank for introducing steam to said condenser in said water heater tank and a second conduit in fluid communication with said water heater tank for receiving water from said condenser in said water heater tank;
a tray supporting said distiller below said water tank; and
a water sensor which deactivates said distiller in the presence of water in said tray, said water sensor carried by said tray.

14. The water supply system as recited in claim 13, further comprising a frame having an interior and a top, said top of said frame supporting said water heater tank, said tray being removably positioned in said interior.

15. The water supply system as recited in claim 14, wherein said frame further comprises a horizontal track assembly positioned in said interior, said horizontal track assembly maintaining alignment of said tray when said tray is moved between a first position wherein said tray is inserted in said frame and a second position wherein said tray is extracted from said frame.

16. The water supply system as recited in claim 15, wherein said tray further comprises a guide assembly, said guide assembly engaging said track assembly to facilitate movement of said tray between said first position and said second position.

17. The water supply system as recited in claim 14, wherein said frame has a front and said water supply system further comprises a front cover positioned over said front of said frame.

18. The water supply system as recited in claim 17, wherein said front cover has a top and said water supply system further comprises a top cover positioned on said top of said front cover and said top of said frame.

19. The water supply system as recited in claim 18, wherein top cover further comprises:
a base plate having a cut out section; and
a vertical member positioned over said cut out section, said vertical member having a front, opposing sides and a top, said first and second conduits extending through said cut out section and positioned within said interior of said vertical member.

20. The water supply system as recited in claim 14, wherein said frame has opposing sides and a back, said water supply system further comprising paneling positioned over said opposing sides and said back of said frame.

21. A removable distiller comprising:
a tray having a front, a back and an exterior surface;
a distiller supported by said tray;
a frame having an interior dimensioned to receive said tray, said frame having a bottom region and a top;
a track assembly positioned in said frame, said track assembly maintaining alignment of said tray when said tray is moved between a first position wherein said tray is extracted from said frame and a second position wherein said tray is inserted in said frame; and
a guide assembly attached to said tray, said guide assembly facilitating movement of said tray between said first position and said second position.

22. The distiller as recited in claim 21, wherein said track assembly further comprises:
a first track horizontally positioned in said bottom region of said frame, said first track extending from said front to said back of said frame; and
a second track horizontally positioned in said bottom region of said frame, said second track placed in spaced relation to said first track, said second track extending from said front to said back of said frame.

23. The distiller as recited in claim 21, wherein said frame has opposing sides and a back and said distiller further comprises paneling covering said back and said opposing sides of said frame.

24. The distiller as recited in claim 21, wherein said frame has a front and said distiller further comprises a front cover positioned over said front of said frame.

25. The distiller as recited in claim 21, wherein said back of said tray is formed with a handle.

26. A movable distiller comprising:
a tray having a front, a back and an exterior surface;
a distiller supported by said tray;
a frame having an interior dimensioned to receive said tray, said frame having a bottom region a top, a front and a back;
a track assembly positioned in said frame, said track assembly maintaining alignment of said tray when said tray is moved between a first position wherein said tray is extracted from said frame, and a second position wherein said tray is inserted in said frame, wherein said track assembly comprises:
a first track horizontally positioned in said bottom region of said frame, said first track extending from said front to said back of said frame wherein said first track includes:
a first horizontal platform attached to said frame, and
a first L-shaped member attached to said first horizontal platform; and
a second track horizontally positioned in said bottom region of said frame, said second track placed in spaced relation to said first track, said second track extending from said front to said back of said frame, wherein said second track includes;
a second horizontal platform attached to said frame, and
a second L-shaped member attached to said second horizontal platform; and
a guide assembly attached to said tray, said guide assembly facilitating movement of said tray between said first position and said second position.

27. A movable distiller comprising:
a tray having a front, a back and an exterior surface;
a distiller supported by said tray;
a frame having an interior dimensioned to receive said tray, said frame having a bottom region, a top, a front and a back;
a track assembly positioned in said frame, said track assembly maintaining alignment of said tray when said tray is moved between a first position wherein said tray is extracted from said frame, and a second position wherein said tray is inserted in said frame, wherein said track assembly includes:
a first track horizontally positioned in said bottom region of said frame, said first track extending from said front to said back of said frame;
a second track horizontally positioned in said bottom region of said frame, said second track placed in spaced relation to said first track, said second track extending from said front to said back of said frame; and
a guide assembly attached to said tray, said guide assembly facilitating movement of said tray between said first position and said second position, wherein said guide assembly includes:
  a first strip of material having a low coefficient of friction attached to said exterior surface of said tray, said first strip of material slidingly engaging said first track; and
  a second strip of material having a low coefficient of friction attached to said exterior surface of tray, said second strip of material slidingly engaging said second track.

28. The distiller as recited in claim 27, wherein said first strip and said second strips are tetrafluoroethylene.

29. A movable distiller comprising:
  a tray having a front, a back and an exterior surface;
  a distiller supported by said tray;
  a frame having an interior dimensioned to receive said tray, said frame having a bottom region a top, and a front
  a track assembly positioned in said frame, said track assembly maintaining alignment of said tray when said tray is moved between a first position wherein said tray is extracted from said frame, and a second position wherein said tray is inserted in said frame;
  a guide assembly attached to said tray, said guide assembly facilitating movement of said tray between said first position and said second position; and
  a front cover positioned over said front of said frame, said front cover including:
    a front plate having a top, a first side and an opposing second side and a bottom;
    a first side plate extending approximately orthogonally from said first side of said front plate; and
    a second side plate extending approximately orthogonally from said second side of said front plate.

30. The distiller as recited in claim 29, wherein the exterior surface of said front plate is formed with a handle.

31. The distiller as recited in claim 29, further comprising a top cover attached to said top of said frame and positioned over said top of said front cover.

32. A movable distiller system comprising:
  a tray having a front, a back and an exterior surface;
  a movable distiller supported by said tray, said tray having a back;
  a frame having an interior dimensioned to receive said tray, said frame having a bottom region; and
  a track assembly positioned in said bottom region of said frame, said track assembly maintaining alignment of said tray when said tray is moved between a first position wherein said tray is inserted in said frame and a second position wherein said tray is extracted from said frame, said track assembly having a top surface.

33. The movable distiller system as recited in claim 32, wherein said top surface of said track assembly is attached to a material having a low coefficient of friction, said material slidingly engaging said exterior surface of said tray when said tray is moved from said first to said second position.

34. The movable distiller system as recited in claim 33, wherein said material attached to said top surface of said track assembly is tetrafluoroethylene.

35. The movable distiller system as recited in claim 32, further comprising a water heater tank supported by said frame and a condenser in fluid communication with said movable distiller.

36. The movable distiller system as recited in claim 35, wherein said condenser is positioned in said water heater tank.

37. A movable water distiller for use with a faucet, and a condenser positioned in a water heater tank comprising:
  a boiling chamber;
  a storage tank in fluid communication with said boiling chamber;
  a pump in fluid communication with said storage tank, said pump pumping water from said storage tank to the faucet;
  a control box in electrical connection with said boiling chamber and said pump;
  a tray, said boiling chamber, said storage tank, said pump and said control box carried by said tray, said tray having an exterior surface;
  a frame dimensioned to receive said tray, wherein said frame includes a horizontal track assembly, said track assembly maintaining alignment of said tray when said tray is moved between a first position wherein said tray is extracted from said frame and a second position wherein said tray is inserted in said frame; and
  a fluid sensor positioned in said tray, said fluid sensor being in operational connection with said control box, said control box deactivating said pump and said boiling chamber when said fluid sensor senses a preselected quantity of fluid in said tray.

38. The movable water distiller as recited in claim 37, wherein said boiling chamber and said storage tank are in fluid communication with the condenser, wherein said boiling chamber forwards steam to the condenser and said storage tank receives condensed water from the condenser.

39. A movable water distiller comprising:
  a boiling chamber;
  a storage tank in fluid communication with said boiling chamber;
  a pump in fluid communication with said storage tank;
  a control box in electrical connection with said boiling chamber and said pump;
  a tray, said boiling chamber, said storage tank, said pump and said control box carried by said tray, said tray having an exterior surface;
  a frame dimensioned to receive said tray, wherein said frame further comprises a horizontal track assembly, said track assembly maintaining alignment of said tray when said tray is moved between a first position wherein said tray is extracted from said frame, and a second position wherein said tray is inserted in said frame;
  a fluid sensor positioned in said tray, said fluid sensor being in operational connection with said control box, said control box deactivating said pump and said boiling chamber when said fluid sensor senses a preselected quantity of fluid in said tray; and
  a material having a low coefficient of friction attached to said exterior surface of said tray, said material slidingly engaging said track assembly when said tray is moved between said first and said second positions.

40. The movable water distiller as recited in claim 39, further comprising a condenser, wherein said boiling chamber and said storage tank are in fluid communication with said condenser, wherein said boiling chamber forwards steam to said condenser and said storage tank receives condensed water from said condenser.

41. A movable water distiller comprising:
  a boiling chamber;
  a storage tank in fluid communication with said boiling chamber;

a pump in fluid communication with said storage tank;

a control box in electrical connection with said boiling chamber and said pump;

a tray, said boiling chamber, said storage tank, said pump and said control box carried by said tray, said tray having an exterior surface;

a frame dimensioned to receive said tray, wherein said frame further comprises a horizontal track assembly, said track assembly maintaining alignment of said tray when said tray is moved between a first position wherein said tray is extracted from said frame and a second position wherein said tray is inserted in said frame, said track assembly having a top surface, and wherein a material having a low coefficient of friction is attached to said top surface of said track assembly, said material slidingly engaging said exterior surface of said tray when said tray is moved between said first and said second positions; and a fluid sensor positioned in said tray, said fluid sensor being in operational connection with said control box, said control box deactivating said pump and said boiling chamber when said fluid sensor senses a preselected quantity of fluid in said tray.

42. The movable water distiller as recited in claim 41, further comprising a condenser, wherein said boiling chamber and said storage tank are in fluid communication with said condenser, wherein said boiling chamber forwards steam to said condenser and said storage tank receives condensed water from said condenser.

43. A water supply system comprising:

a water heater tank;

a frame, said frame supporting said water heater tank, said frame having a bottom region;

a movable distiller removably positioned in said frame, said movable distiller in fluid communication with said water heater tank; and a horizontal track assembly positioned in said bottom region of said frame, said track assembly maintaining alignment of said movable distiller when said movable distiller is moved between a first position, wherein said movable distiller is inserted in said frame, and a second position wherein said movable distiller is extracted from said frame.

\* \* \* \* \*